United States Patent
Faist

(10) Patent No.: US 8,161,813 B2
(45) Date of Patent: Apr. 24, 2012

(54) FILL LEVEL MEASURING IN MOBILE CONTAINERS OR TRANSPORT SILOS

(75) Inventor: Fridolin Faist, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 565 days.

(21) Appl. No.: 12/424,162

(22) Filed: Apr. 15, 2009

(65) Prior Publication Data

US 2009/0288482 A1 Nov. 26, 2009

Related U.S. Application Data

(60) Provisional application No. 61/054,940, filed on May 21, 2008.

(30) Foreign Application Priority Data

May 21, 2008 (EP) .................................... 08156670

(51) Int. Cl.
*G01F 23/00* (2006.01)
(52) U.S. Cl. ........................................................ 73/291
(58) Field of Classification Search ...................... 73/291
See application file for complete search history.

(56) References Cited

U.S. PATENT DOCUMENTS

| 4,907,451 A | 3/1990 | Fleetham | |
|---|---|---|---|
| 6,625,526 B2 * | 9/2003 | Gras | 701/29 |
| 2004/0079150 A1 * | 4/2004 | Breed et al. | 73/291 |
| 2004/0129075 A1 * | 7/2004 | Sorenson | 73/313 |

FOREIGN PATENT DOCUMENTS

| DE | 197 06 869 | 9/1997 |
|---|---|---|
| DE | 197 30 593 | 1/1999 |
| DE | 199 14 726 | 12/1999 |
| DE | 101 12 172 | 9/2001 |
| FR | 2 907 212 | 4/2008 |
| GB | 2 289 542 | 11/1995 |
| WO | 98 / 26953 | 6/1998 |
| WO | 2008 / 047016 | 4/2008 |

* cited by examiner

*Primary Examiner* — Hezron E Williams
*Assistant Examiner* — Nathaniel Kolb
(74) *Attorney, Agent, or Firm* — Fay Kaplun & Marcin, LLP

(57) ABSTRACT

A fill level in a mobile container or in a transport silo is determined using a position sensor that measures the angle of inclination of the container. The fill level data is acquired using a fill level sensor. On the basis of the measured data of the position sensor it is possible to detect whether or not the fill level measuring is valid. In this way incorrect readings may be rejected.

15 Claims, 7 Drawing Sheets

| Name | Date | Time | Sensor value | Percentage value | Lin-percentage value | Scaled value |
|---|---|---|---|---|---|---|
| CAL-MST1 | 14.04.2008 | 14:30:45 | Transport | Transport | Transport | Transport |
| CAL-MST2 | 14.04.2008 | 14:30:45 | 0.65 m(d) | 0.00 % | 0.00 lin% | 0 % |
| Diesel tank | 14.04.2008 | 08:00:59 | 3.996 mA | -0.02 % | -0.02 lin% | -0.02 % |
| TAG no. 3 | 14.04.2008 | 14:30:45 | 0 % | 0.00 % | 0.00 lin% | 0 % |

| Display period | | Actual hours (8h) | | | |
|---|---|---|---|---|---|
| 301 | 302 | 303 | 304 | 305 | 306 |
| Date | Time | Diesel tank [%] | CAL-MST1 [%] | CAL-MST2 [%] | TAG no. 3 [%] |
| 14.04.2008 | 14:30:45 | 18,00 | Transport | 0,00 | 0,00 |
| 14.04.2008 | 13:30:45 | 18,00 | Transport | 0,00 | 0,00 |
| 14.04.2008 | 12:30:20 | 18,00 | Transport | 0,00 | 0,00 |
| 14.04.2008 | 11:33:24 | 18,00 | Transport | Störung | Störung |
| 14.04.2008 | 10:30:45 | 18,00 | 0,00 | 0,00 | 0,00 |
| 14.04.2008 | 10:26:19 | 18,00 | 0,00 | 0,00 | 0,00 |
| 14.04.2008 | 10:22:40 | 18,00 | 0,00 | 0,00 | 0,00 |
| 14.04.2008 | 10:15:25 | 18,00 | 18,00 | 18,00 | 0,00 |
| 14.04.2008 | 09:30:46 | 18,00 | 2,55 | 2,55 | 0,00 |
| 14.04.2008 | 08:30:46 | 18,00 | 2,73 | 2,73 | 0,00 |

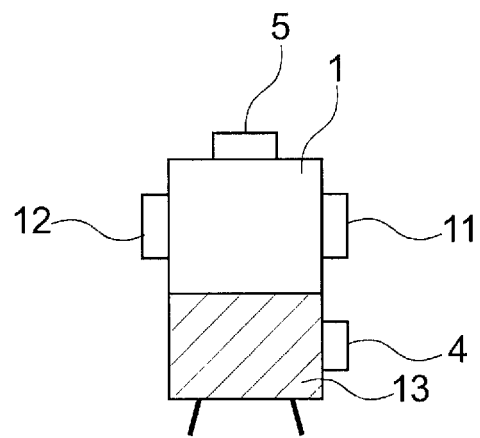
Fig. 7
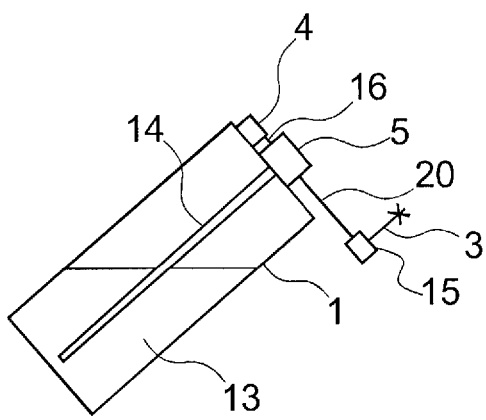
Fig. 8
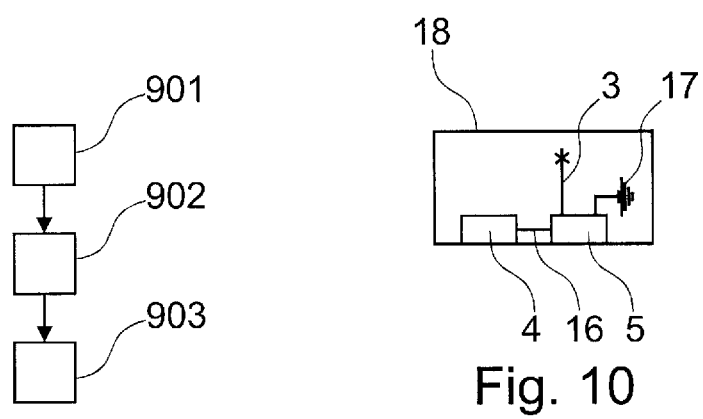
Fig. 9
Fig. 10

○ Linear
◉ Round tank on its side
○ Ball tank
○ Flow-through

○ Freely programmable

Linearisation table 1

| Nr. | %     | lin%  |
|-----|-------|-------|
| 0   | 0,00  | 0,00  |
| 1   | 3,13  | 0,81  |
| 2   | 6,25  | 2,33  |
| 3   | 9,38  | 4,31  |
| 4   | 12,50 | 6,66  |
| 5   | 15,63 | 9,32  |
| 6   | 18,75 | 12,25 |
| 7   | 21,88 | 15,41 |
| 8   | 25,00 | 18,77 |
| 9   | 28,13 | 22,30 |
| 10  | 31,25 | 25,99 |
| 11  | 34,38 | 29,80 |
| 12  | 37,50 | 33,71 |
| 13  | 40,63 | 37,71 |
| 14  | 43,75 | 41,78 |
| 15  | 46,88 | 45,88 |
| 16  | 50,00 | 50,00 |
| 17  | 53,13 | 54,12 |
| 18  | 56,25 | 58,22 |

Value assignments for scaled display values 0 lin % corresponds to [ 0.00 ] m³   Measured quantity    Measuring unit
                                     [ Volume    ⌄ ]      [ m³  ⌄ ]
100 lin % corresponds to [ 35.00 ] m³

Fig. 15

FILL LEVEL MEASURING IN MOBILE CONTAINERS OR TRANSPORT SILOS

PRIORITY CLAIM

This application claims the benefit of the filing date of EP Patent Application Serial 08 156 670.5 filed on May 21, 2008 and U.S. Provisional Patent Application Ser. No. 61/054,940 filed on May 21, 2008, the disclosure of which applications is hereby incorporated herein by reference.

FIELD OF THE INVENTION

The present invention relates to fill level measuring. In particular, the invention relates to a fill-level measuring device for determining a fill level in a mobile container or in a transport silo, to a fill-level measuring system comprising such a fill-level measuring device, and to a method for determining a fill level.

TECHNOLOGICAL BACKGROUND

Present-day mobile containers and transport silos only rarely comprise fill level measuring, because many hitherto-known measuring systems may hardly be available and may rarely be useable in an economic manner.

With mobile containers or transport silos it is frequently the case that they are moved for transport or for maintenance work, and, as a result of this, invalid fill level information is measured that is unable to correctly reflect the true container fill level.

SUMMARY OF THE INVENTION

It may be desirable to provide improved determination of a fill level in the case of mobile containers and transport silos.

According to an exemplary embodiment of the invention a fill-level measuring device for determining a fill level in a mobile container or in a transport silo is stated, which container or transport silo comprises a fill level sensor for the acquisition of first measured data that corresponds to the fill level in the container. Furthermore, a position sensor for the acquisition of second measured data is provided, which data corresponds to an operating position of the container, wherein by means of the second measured data it is possible to determine whether the operating position of the container is suitable for fill level determination using the fill level sensor.

The fill-level measuring device for the acquisition of the fill level information thus takes into account whether or not the current measured value is valid. Evaluation of the data of the position sensors and of the data of the fill level sensor can take place within the fill-level measuring device or in an external evaluation unit which is, for example, connected to a server or integrated in this server.

If the mobile container or the transport silo is thus, for example for transport or for carrying out maintenance work, brought to a tilted state, the position sensor detects this tilted state, after which either the fill-level measuring device itself or an external system is able to determine whether the fill level data measured at this point in time is valid or invalid. This is, in particular, advantageous when the measuring cycles and transmission cycles of the measured data follow a fixed time grid so that during the transport times or maintenance work some invalid fill level information is acquired and, for example, transmitted to the server.

A "mobile" container or transport silo may be a container designed for being transported during operation, i.e. while being filled with a filling good. Such a "mobile" container may not be a fuel tank for a vehicle designed to provide fuel for the engine of the vehicle, but a container which is used to store a filling good and may be also used to transport the filling good from one place to another place without the filling good being consumed.

According to an exemplary embodiment of the invention, this invalid fill level information may be distinguished from the valid fill level information.

The fill level is, for example, shown as being valid only if the container or the silo is in an predetermined definable operating position.

It should be pointed out that the exemplary embodiments described above and yet to be described below equally relate to the fill-level measuring device, the fill-level measuring system and the method.

According to a further exemplary embodiment of the invention, the position sensor is designed for the acquisition of an angle of inclination of the container or of the transport silo.

The position sensor can thus precisely define the point in time at which the container is in a defined inclined position. In another exemplary embodiment the position sensor can be designed to detect discrete inclination states of the mobile container or of the transport silo. For example, the position sensor can be designed to detect the position of the container standing upright, and the position, tilted by 90°, in which said container is lying on its side. In this case the position sensor is designed in a particularly simple manner.

For example, the fill-level measuring device or the fill-level measuring system is able to detect a defined angular range, which can be predetermined by a user (for example angles of inclination of the container between +10° and −10° or between +5° and −5°), in which angular range the container is situated, and identify it as a "valid operating position of the container". In contrast to this, if the container is tilted to a greater extent, an "invalid operating position of the container" is identified. In this case the inclinometer can be a sensor for the acquisition of discrete inclination values.

According to a further exemplary embodiment of the invention, the fill-level measuring device further comprises an evaluation unit for determining the fill level based on the first measured data and the second measured data.

If need be, the position sensor or the fill level sensor may already carry out pre-processing or analysis of the acquired measured data, the result of which then transmitted to the evaluation unit. The evaluation unit then (if still required) analyses the received first and second measured data (which if need be has been prepared) and from this determines the fill level. Fill level readings that correspond to invalid operating positions of the container are, for example, marked as being invalid and are rejected or stored as being invalid.

The evaluation unit may also be arranged in an external receiver, or can be connected to an external receiver.

According to a further exemplary embodiment of the invention, the evaluation unit is designed for the precise determination of the fill level even if the container is tilted.

This exemplary embodiment is, for example, shown in FIG. 8. In this case the fill level sensor is, for example, a bar probe that is immersed in the product. However, it can also be a floating sensor that is guided along a guide rod.

From the measured data of the fill level sensor and from the position data of the position sensor (angle of inclination of the container) the fill level can be calculated. To this effect the container geometry needs to be known.

According to a further exemplary embodiment of the invention, the fill level sensor is a radar sensor, a pressure sensor, an ultrasound sensor, a limit level sensor or a capacitive sensor.

According to a further exemplary embodiment of the invention, the fill-level measuring device further comprises a communication unit for transmitting measuring signals to a receiver, wherein the measuring signals are based on the first and the second measured data.

If need be the first and the second measured data are pre-evaluated during fill-level measuring and are processed elsewhere before they are then transmitted, in the form of measuring signals, to the receiver. Furthermore, the first and the second measured data can be transmitted as "raw data" directly to the receiver, which then carries out the analysis completely on its own.

In this manner the computing capacity may be completely relocated to the receiver.

According to a further exemplary embodiment of the invention, the fill level sensor comprises an interface for connection to the position sensor, wherein the fill level sensor is designed for receiving the second measured data from the position sensor, and for transmitting the measuring signals in digitalised form to the communication unit of the receiver.

According to a further exemplary embodiment of the invention, the fill level sensor, the position sensor, the communication unit and the battery to supply power to the sensor and to the communication unit are integrated in a shared housing.

In this way a compact, resistant measuring module may be provided which is affixed as an individual component to the container or silo.

According to a further exemplary embodiment of the invention, evaluation of the first measured data and of the second measured data is carried out in the receiver.

According to a further exemplary embodiment of the invention, the fill-level measuring device further comprises a second fill level sensor which is arranged on the container such that it can carry out substitute measuring when the operating position of the container is not suitable for fill level determination using the first fill level sensor.

In this way the fill level may be measured even if the first sensor "fails" due to excessive tilting of the container.

According to a further exemplary embodiment of the invention, a fill-level measuring system for determining a fill level in a mobile container or in a transport silo is stated, which fill-level measuring system comprises a fill-level measuring device as described above, as well as a receiver for receiving measuring signals from the fill-level measuring device, which measuring signals are based on the first and second measured data.

According to a further exemplary embodiment of the invention, the receiver is a central server. In this way measuring signals can be received from many different fill-level measuring devices that are spread across the entire globe, and can be administered.

According to a further exemplary embodiment of the invention, the fill-level measuring device is designed for the transmission of the measuring signals to the receiver by way of a wireless connection via the internet.

According to a further exemplary embodiment of the invention, the fill-level measuring device is designed for carrying out several measuring cycles, wherein the fill-level measuring device is designed for storing in pairs the measuring signals from each of the measuring cycles, and for subsequent transmission of the collected measuring signals to the receiver.

According to a further exemplary embodiment of the invention, the receiver is designed for storing fill level information and the determined suitability of the operating position of the container based on the received measuring signals together with a time stamp so that a user at a later point in time can access all the fill level information received in the receiver.

For example, in this way it may be determined after the event at what point in time and to what extent the container was tilted.

According to a further exemplary embodiment of the invention, a method for determining a fill level in a mobile container or in a transport silo is stated, in which method first measured data that corresponds to the fill level in the container is acquired. Furthermore, second measured data that corresponds to an operating position of the container is acquired. Thereafter, by means of the first and the second measured data it is determined whether the operating position of the container is suitable for fill level determination using the fill level sensor.

Below, exemplary embodiments of the invention are described with reference to the figures.

BRIEF DESCRIPTION OF THE FIGURES

FIG. 7 shows a fill-level measuring device according to an exemplary embodiment of the invention.

FIG. 8 shows a further fill-level measuring device according to a further exemplary embodiment of the invention.

FIG. 9 shows a flow chart of a method according to an exemplary embodiment of the invention.

FIG. 10 shows a fill-level measuring device according to a further exemplary embodiment of the invention.

FIG. 15 shows value assignments for scaled display values.

DETAILED DESCRIPTION OF EXEMPLARY EMBODIMENTS

Figures 1, 2:
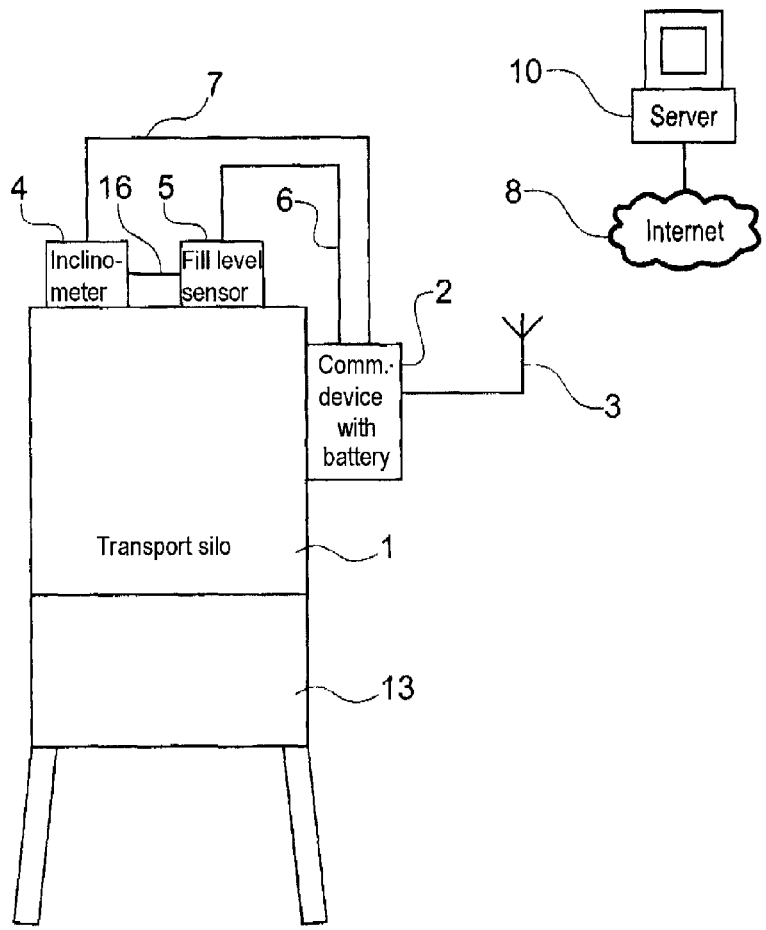
FIG. 1 shows a cross-sectional view of a fill-level measuring system according to an exemplary embodiment of the invention.
FIG. 2 shows the measured data according to an exemplary embodiment of the invention.

The illustrations in the figures are diagrammatic and not to scale.

In the following description of the figures the same reference characters are used for identical or similar elements.

FIG. 1 shows a fill-level measuring system according to an exemplary embodiment of the invention.

The fill-level measuring system comprises a fill level sensor 5, an inclinometer 4 and a communication device comprising a battery 2. The communication device 2 is connected to the fill level sensor 5 or the inclinometer 4 by way of corresponding data lines 6, 7. Furthermore, the two sensors 4, 5 can be interconnected by way of an interface 16. In this case only one of the two data lines 6, 7 to the communication device 2 may be needed.

The communication device 2 is connected to an antenna 3, by way of which it can communicate with the central server 10 via a wireless communication connection, for example via the internet 8.

The sensors 4, 5 are affixed to the mobile container or to the transport silo 1. The transport silo contains a product 13.

The communication device 2 is a self-sufficient communication device which comprises a battery-supported supply, a choice between analog and digital measuring inputs, as well as a connection to mobile radio systems, for example via GPRS (General Packet Radio Service) or GSM (Global System for Mobile Communications).

By way of the mobile radio connection the measured values can be transmitted via internet to the server 10 for further processing. The communication device 2 comprises, for example, a suitable power management device. This means that the sensors 4, 5 are cyclically activated, or activate themselves, to carry out a reading, and then for an extended period of time change back to a power-saving mode.

Transmission of the measured values to the server 10 also only takes place for a defined transmission period with subsequent changing to the power-saving mode. The repetition rate for a reading and for a transmission period can be programmed in the communication device 2. Typical values are, for example, one reading per hour and one transmission period per day. In this arrangement the individual readings are collected and during the transmission period are transferred to a measured-value block.

In order to determine the fill level in the mobile container or transport silo 1, any of the currently common measuring systems such as pressure sensors, radar sensors, ultrasound sensors, capacitive measuring systems or weighing systems are used. The communication device acquires the fill level information either by way of analog current- or voltage inputs or by way of digital inputs. The communication device 2 then either transmits this information directly to the server, or first scales the values to a desired value range before transmitting the values to the server.

In addition to the fill level sensors described above and to the communication device an inclinometer 4 is used. When measuring the fill levels, the inclinometer 4 supplies the required information relating to the state of inclination of the transport silo or of the mobile container 1. Based on this information, the acquired fill level information can then be accompanied by a status message either "Operating position of the container is valid" or "Operating position of the container is invalid". Thus the validity of the fill level information that is transmitted to the server can in a simple way be labelled and rendered useable for subsequent evaluation.

In other words, fill-level measuring data is combined with an inclination reading in the mobile container or transport silo. To this effect the transport silo 1 comprises the sensor 5 for fill level measuring and a second sensor 4 for determining the container inclination. The two measuring signals are fed to the inputs of the communication device 2 by way of the connections 6 and 7. The communication device 2 stores in pairs the two measuring signals from each measuring cycle and transmits the collected measured values at preset points in time block by block to the server 10 by way of the mobile radio connection 3 or by way of the internet 8. The server 10 can, for example, be a server as used for the data logging visualisation system WEB-VV of VEGA Grieshaber KG.

In the server 10 all the incoming fill level information is stored together with a time stamp and the determined status, either "Operating position of the container is valid" or "Operating position of the container is invalid" and taken together to form an archive. In this way access to all the data received by the server can be obtained at a later point in time.

Access to data contained on the server 10 may, for example, also be by way of the internet. To this effect the server additionally comprises a web server that provides users with various forms of displaying measured values.

Forms of displaying the prepared measured data are shown in FIGS. 2 to 5.

FIG. 2 shows a tabular form of presentation that reflects the process. In relation to valid operating positions of the container, the fill-level measuring values are shown in column 201, the corresponding percentage values in column 202, the Lin percentage values in column 203 and the scaled values in column 204. The time and date of measuring are shown in columns 205 and 206 respectively. The fields in column 207 denote the various containers.

For fill level measuring, sensors typically acquire the actual fill level in the physical unit inherent in the particular measuring principle. For example, non-contact measuring systems such as ultrasound sensors or radar sensors measure a distance value (installed position to the product surface) in metres; while pressure-measuring systems acquire, for example, the hydrostatic pressure in bars.

These measured values in the physical unit are designated sensor values. However, as a rule, no knowledge concerning the resulting percentage fill level is gained from this information.

Figure 11:
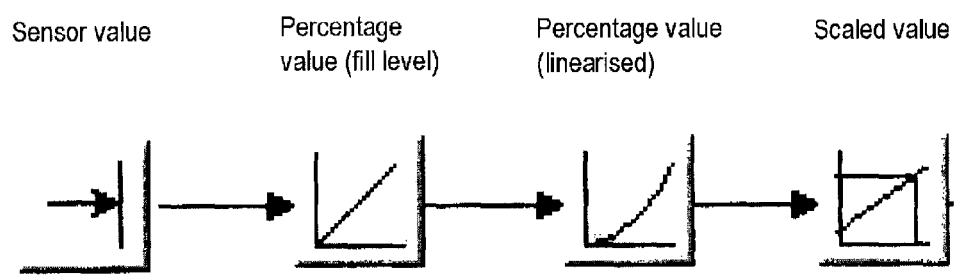
FIG. 11 shows functional blocks for fill-level measuring devices.

FIG. 11 shows functional blocks of fill-level measuring devices, which functional blocks the sensors provide for further processing of the sensor values.

To make it possible for a sensor (or for a device arranged downstream) to calculate the fill level percentage, parameterisation of the sensor (or of the device arranged downstream) may have to take place, for example, in the following way:

The ultrasound sensor is installed so as to be flush with the container ceiling; the container is 10 m high (measured from the container bottom).

Parameterisation:

Sensor value: 0 m corresponds to percentage value (fill level) 100%

Sensor value: 10 m corresponds to percentage value (fill level) 0%

Figure 12:
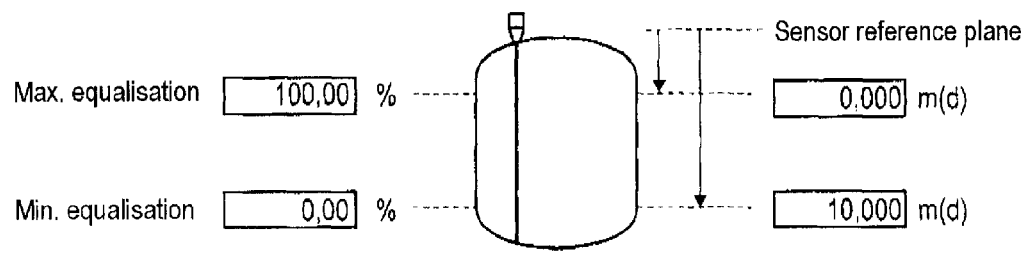
FIG. 12 shows a container with a fill-level measuring device.

This is shown in FIG. 12

On the basis of these two value pairs the sensor can determine the straight line function in relation to all intermediate values.

After the determination of the percentage values (fill level), by way of a further conversion based on a programmable linearisation function, the so-called lin % percentage values (volume or linearised) can be calculated. Programming the linearisation function can take place by selecting a defined container geometry or by inputting a linearisation table.

Figure 13:
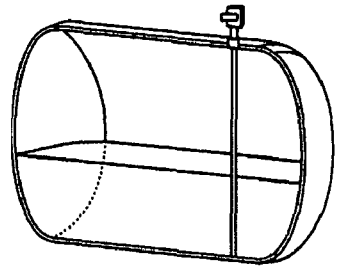
FIGS. 13 and 14 show a linearisation of the measured values.
Figure 14:
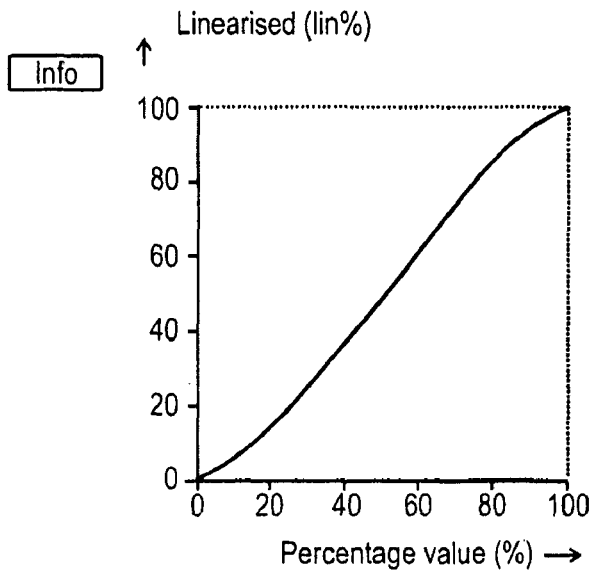

This linearisation is shown in FIGS. 13 and 14.

Thus the lin % values provide relative information about the fill quantity actually present in the container.

If one wants to know the fill quantity that is absolutely present in the container, the sensors (or devices arranged downstream) further provide the option of scaling the lin % values.

FIG. 15 shows the value assignments relating to scaled display values.

Based on the lin % values, conversion can take place based on the two value pairs by way of the associated straight-line function.

If the system detects that the fill-level measuring data is incorrect because the operating position of the container is invalid, "Transport" is entered into the corresponding fields of columns 201 to 204.

Figures 3, 4:
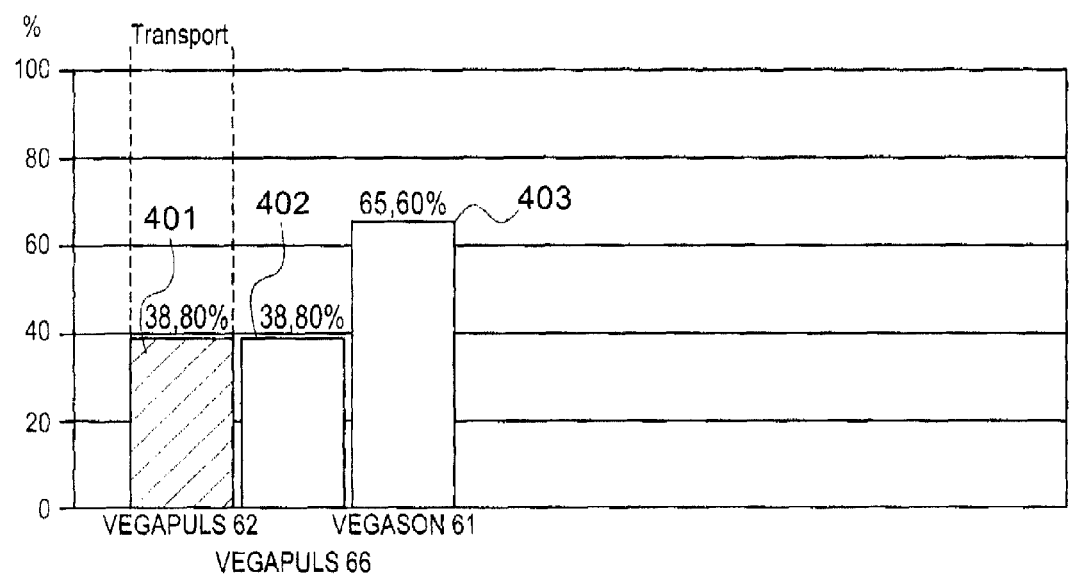
FIG. 3 shows the measured data according to a further exemplary embodiment of the invention.
FIG. 4 shows the measured data according to a further exemplary embodiment of the invention.

FIG. 3 shows a further exemplary embodiment of a form of presentation. The history is shown in tabular form. The date and time are entered in columns 301 and 302. In columns 303 to 306 the fill-level measuring values of the individual containers have been entered, if need be after corresponding preparation, provided the operating position of the corresponding container is valid. If the operating position of the container has been identified as being invalid, the text "Transport" has been entered in the fields. If there is a malfunction of the measuring system, "Malfunction" has been entered.

The display in the table of FIG. 3 refers to the last 8 hours, wherein the display period can be selected by the user.

FIG. 4 shows a third form of presentation of the measured data, this time graphically as a process image showing bars. In relation to valid operating positions of the container the measured values are shown as bars 402, 403 (38.80 or 65.60%). In relation to invalid operating positions of the container (see bar 401) the respective last valid measured value (in the present example 38.80%) is shown as a bar with the additional text "Transport". Optionally, the bar can be hatched and/or can comprise auxiliary lines to clearly point out the status.

Figure 5:
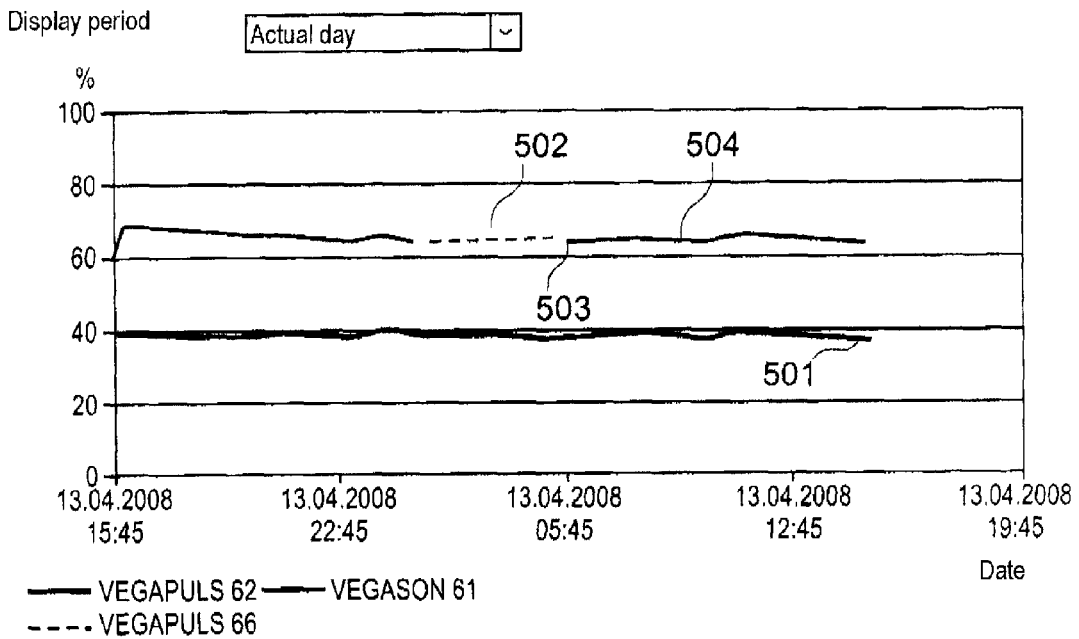
FIG. 5 shows the measured data according to a further exemplary embodiment of the invention.

FIG. 5 shows a further exemplary embodiment of a presentation of the measured data in the form of a historic progression as a diagram or line graph. In relation to valid operating positions of the container, the measured values can be presented as a line 501. In relation to invalid operating positions of the container, in the corresponding time interval 502 the measuring line is shown as a dashed line at the level of the last valid measured value. When the operating position of the container at point in time 503 reverts to a valid operating position, the measured values are again shown as a solid line 504.

Of course, instead of the designation "Operating position of the container is invalid" some other text-based or graphic display may also be used.

Figure 6:
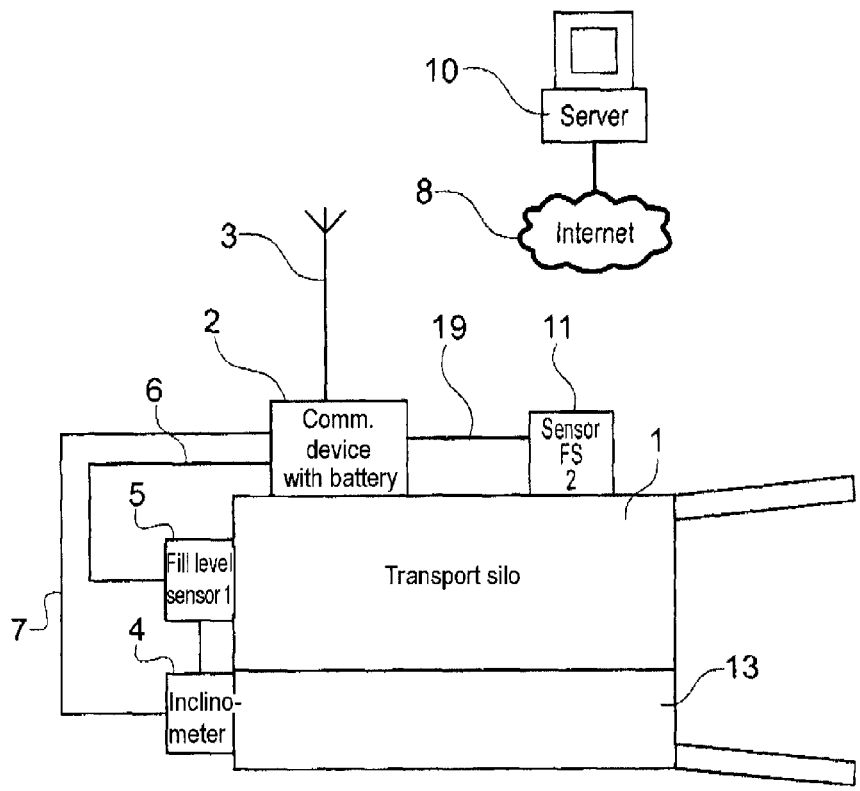
FIG. 6 shows a fill-level measuring system according to a further exemplary embodiment of the invention.

FIG. 6 shows a transport silo 1 with a fill-level measuring device according to a further exemplary embodiment of the invention. Both the inclinometer 4 and the fill level sensor 5 are connected by way of their own lines 7 and 6 to the communication device 2. Furthermore, a second fill level sensor 11 is provided, which is affixed to the container 1 such that substitute measuring in the transport position (as shown in FIG. 6) is possible.

The second fill level sensor 11 is connected to the communication device by way of the line 19 in order to transmit the measured data to said communication device.

FIG. 7 shows a fill-level measuring device according to a further exemplary embodiment of the invention, which fill-level measuring device comprises three fill level sensors 5, 11 and 12, as well as an inclinometer 4. In this case the fill levels can be measured at two different transport positions of the container 1 (container tilted by 90° clockwise or anticlockwise).

Furthermore, further fill level sensors can be provided.

FIG. 8 shows a fill-level measuring device according to a further exemplary embodiment of the invention, in which device the fill level sensor 5 comprises a bar-shaped probe 14 that is immersed in the product 13. By way of the inclinometer 4 the inclination of the container can be measured. The inclinometer 4 transmits the measured container inclination to the fill level sensor 5 by way of the data line or the interface 16. Furthermore, the evaluation electronics 15 comprise an antenna 3 which from the data received calculates the actual fill level (wherein the container inclination is taken into account in the calculations).

The measured result is then transmitted to the receiver. As an alternative, the electronics 15 can also be integrated in the receiver so that in this case only the raw data is transmitted to the receiver.

As shown in FIG. 8, the fill level sensor 5 comprises an input 16 for the inclinometer 4, and forwards both measuring signals (fill-level measuring signals and angle of inclination measuring signals) in digitalised form, by way of a bus connection 20, to the evaluation unit 15 with the antenna 3, or, as an alternative, to a communication device 2.

FIG. 10 shows a housing 18 in which both the inclinometer 4 and the fill level sensor 5, including a battery 17 and an antenna 3, are integrated.

For example, both the fill level information from fill level measuring and the inclination information (angle of inclination in the form of a current signal or digitalised value) are directly forwarded to the server. The evaluation and the corresponding designation "Operating position of the container is valid" or "Operating position of the container is invalid" takes place in the server.

FIG. 9 shows a flow chart of a method in which in step 901 first measured data is acquired by a fill level sensor. In a second step 902, second measured data is acquired by a position sensor. In step 903 a determination is then made as to whether the operating position of the container is suitable for fill level determination using the fill level sensor. This determination is made based on the acquired first and second measured data.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A fill-level measuring device for determining a fill level in a container which includes at least one of a mobile container and a transport silo, comprising:
   a first fill level sensor acquiring first measured data that corresponds to the fill level in the container;
   a position sensor acquiring second measured data that corresponds to an operating position of the container;
   a processor determining, as a function of the second measured data, whether the operating position of the container is suitable for fill level determination using the first fill level sensor; and
   a second fill level sensor arranged on the container such that the second fill level sensor carries out substitute measuring when the operating position of the container is not suitable for fill level determination using the first fill level sensor.

2. The fill-level measuring device according to claim 1, wherein the position sensor acquires an angle of inclination of the container.

3. The fill-level measuring device according to claim 1, further comprising:
   an evaluation unit determining the fill level as a function of the first measured data and the second measured data.

4. The fill-level measuring device according to claim 3, wherein the evaluation unit determines the fill level even if the container is tilted.

5. The fill-level measuring device according to claim 1, wherein the fill level sensor is selected from the group comprising a radar sensor, a pressure sensor, an ultrasound sensor, a limit level sensor and a capacitive sensor.

6. The fill-level measuring device according to claim 1, further comprising:
   a communication unit transmitting measuring signals to a receiver, wherein the measuring signals are determined as a function of the first and the second measured data.

7. The fill-level measuring device according to claim 6, wherein the fill level sensor comprises an interface for connection to the position sensor; and wherein the fill level sensor receives the second measured data from the position sensor and transmits the measuring signals in digitalised form to the receiver.

8. The fill-level measuring device according to claim 6, wherein the fill level sensor, the position sensor, the communication unit and a battery to supply power are integrated in a housing.

9. The fill-level measuring device according to claim 1, wherein evaluation of the first measured data and of the second measured data is carried out in the receiver.

10. A fill-level measuring system for determining a fill level in a container which includes at least one of a mobile container and a transport silo, comprising:
   a fill-level measuring device including (a) a first fill level sensor acquiring first measured data that corresponds to the fill level in the container, (b) a position sensor acquiring second measured data that corresponds to an operating position of the container, (c) a processor determining, as a function of the second measured data, whether the operating position of the container is suitable for fill level determination using the first fill level sensor, and
   (d) a second fill level sensor arranged on the container such that the second fill level sensor carries out substitute measuring when
   acquiring, using a second fill level sensor, third measured data corresponding to the fill level in the container when the operating position of the container is not suitable for fill level determination using the first fill level sensor.

11. The fill-level measuring system according to claim 10, wherein the receiver is a central server.

12. The fill-level measuring system according to claim 10, wherein the fill-level measuring device transmits of the measuring signals to the receiver using a wireless connection via the Internet.

13. The fill-level measuring system according to claim 10, wherein the fill-level measuring device carries out several measuring cycles; and wherein the fill-level measuring device stores in pairs the measuring signals from each of the measuring cycles, and transmits subsequently the collected measuring signals to the receiver.

14. The fill-level measuring system according to claim 10, wherein the receiver stores fill level information and the determined suitability of the operating position of the container is determined as a function of the received measuring signals and a time stamp so that a user, at a later point in time, accesses all the fill level information received in the receiver.

15. A method for determining a fill level in a container which includes at least one of a mobile container and in a transport silo, comprising the steps of:
   acquiring, using a fill level sensor, first measured data, the first measured data corresponding to the fill level in the container;
   acquiring second measured data that corresponds to an operating position of the container; and
   determining, as a function of the first and the second measured data, whether the operating position of the container is suitable for fill level determination using the fill level sensor.

* * * * *